Aug. 1, 1961  S. PELKOWSKI  2,994,516
FLUID AGITATING DEVICE
Filed June 27, 1957  4 Sheets-Sheet 1

INVENTOR.
STANLEY PELKOWSKI
BY
ATTORNEY

Aug. 1, 1961 S. PELKOWSKI 2,994,516
FLUID AGITATING DEVICE
Filed June 27, 1957 4 Sheets-Sheet 3

INVENTOR.
STANLEY PELKOWSKI
BY
ATTORNEY

Aug. 1, 1961  S. PELKOWSKI  2,994,516
FLUID AGITATING DEVICE
Filed June 27, 1957  4 Sheets-Sheet 4
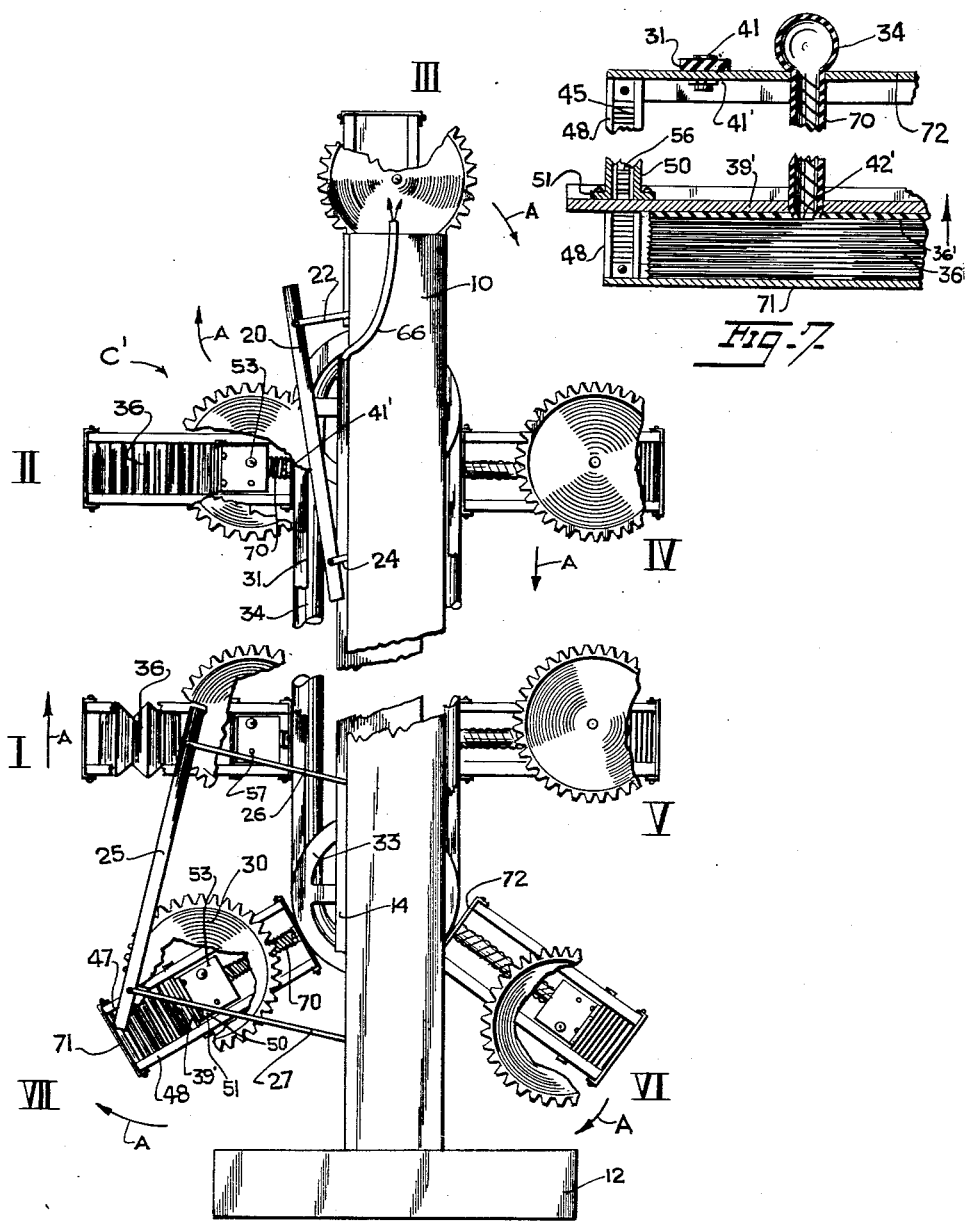
INVENTOR.
STANLEY PELKOWSKI
BY
ATTORNEY

# United States Patent Office 2,994,516
Patented Aug. 1, 1961

2,994,516
FLUID AGITATING DEVICE
Stanley Pelkowski, 607B Britton St., Elizabeth, N.J.
Filed June 27, 1957, Ser. No. 668,530
8 Claims. (Cl. 259—139)

This invention relates to the art of hydraulic devices and particularly concerns an apparatus which maintains a continuous movement of expanding and contracting chambers in a fluid body for maintaining a state of continual agitation and turbulence of the fluid body.

The device embodying the invention is particularly directed at a device which takes advantage of the buoyancy of an air filled chamber in a body of fluid to assist in upward movement of the chamber through the fluid for maintaining a state of turbulence in the body.

It is a principal object of the invention to provide a device having a plurality of expansible chambers movable continuously in a body of fluid for agitating the fluid.

It is a further object to provide a device of the character described wherein the expansible chambers are arranged as bellows interconnected by an endless conduit for passing air from one chamber to another as the chambers are successively expanded and contracted.

It is a further object to provide a device having utility in still water or diverse fluid environments wherein a state of continual agitation or turbulence of the fluid is maintained.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 4 is a plan view of a portion of a bellows chamber in compressed form.

FIG. 5 is a perspective view of a portion of a bellows chamber and associated driving gear members, parts being broken away.

FIG. 6 is a side elevational view of a further form of the invention, parts being broken away.

FIG. 7 is an elevational view partially in section of the bellows member employed in FIG. 6.

Figure 1:
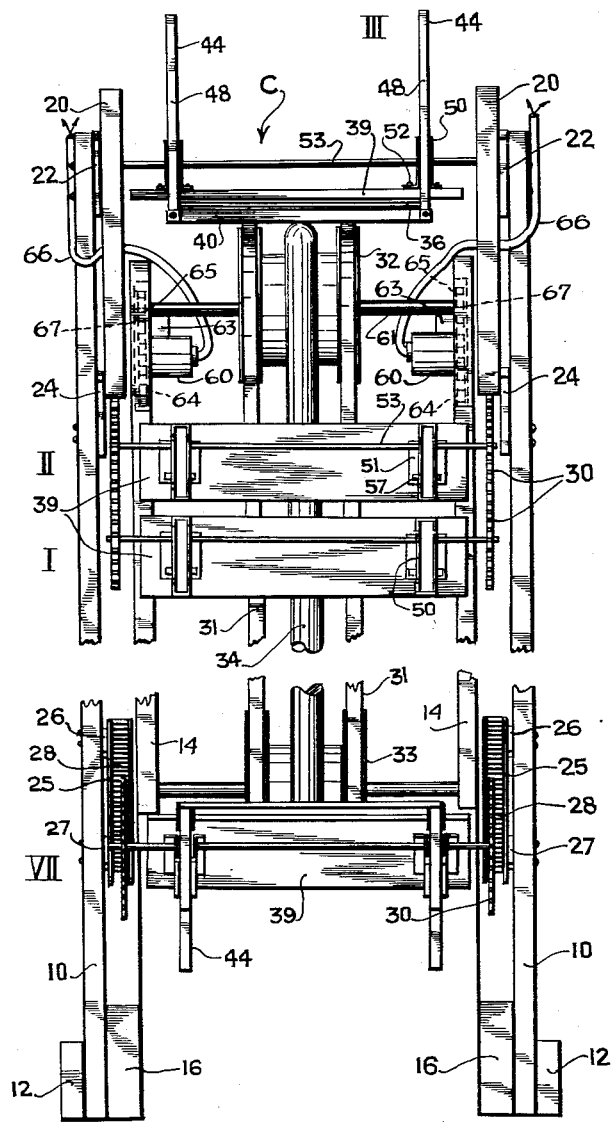
FIG. 1 is a front elevational view of the device embodying the invention, parts being broken away.
Figure 2:
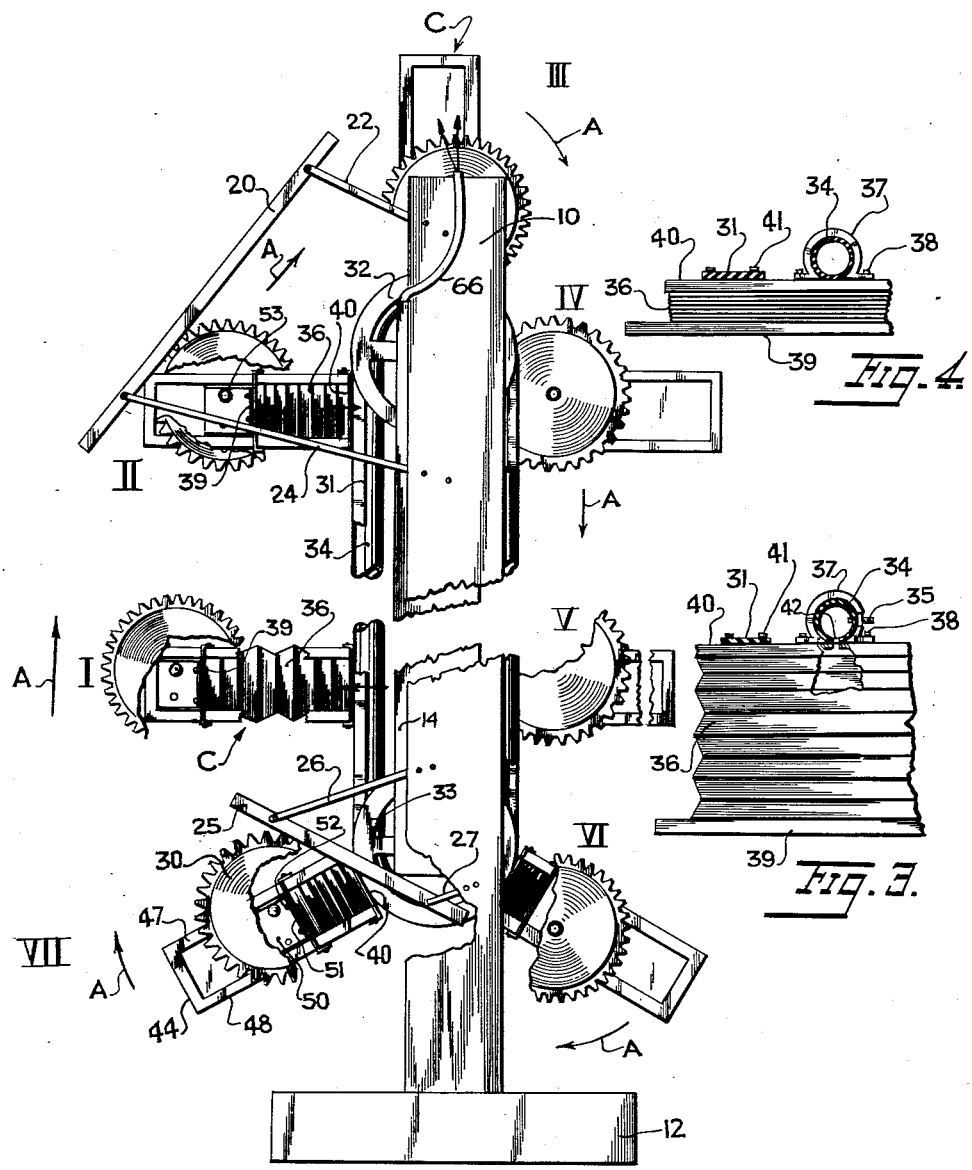
FIG. 2 is a side elevational view, parts being broken away.
Figure 3:
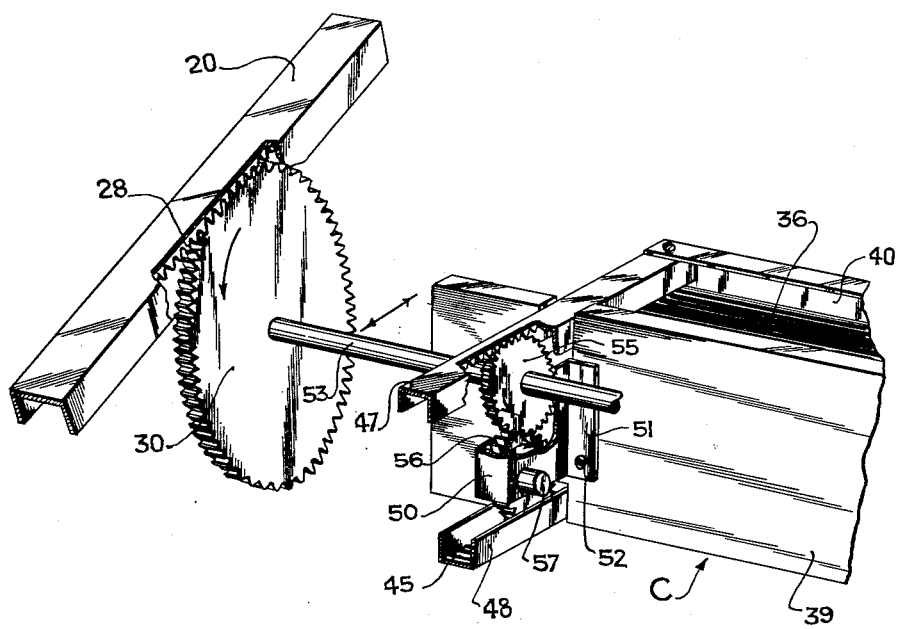
FIG. 3 is a plan view of a portion of a bellows chamber in expanded form, parts being broken away.

Referring to FIGS. 1 and 2 there is shown a pair of vertically disposed spaced frame plates 10 secured to transversely disposed base plates 12. Vertical plates 14 are spaced from plates 10 by spacer members 16. A pair of channel-shaped rack gears 20 are secured in oblique positions by bars 22 and 24 to plates 10. Another pair of channel-shaped rack gears 25 are located below gears 20 and are attached to plates 10 by bars 26 and 27. Gears 25 are inclined downwardly toward their supports while gears 20 are inclined upwardly. All the gears have gear teeth 28 located at the bottoms of the channels. These teeth are intended to be engaged by spur gears 30. Spur gears 30 are mounted on carriage members C which are transported on endless belts 31 over rollers 32 and 33. The rollers are secured to shafts 61 journalled in plates 14. A centrally disposed endless air tube, hose or flexible conduit 34 is also carried on rollers 32, 33. This hose contains air which may be supplied through a conventional air valve 35 as shown in FIG. 3. The hose is secured to a plate 40 by clamps 37 and screws 38. Plate 40 is secured to belts 31 by screws 41.

Each carriage member C includes a rectangular bellows 36 secured between an end plate 39 and plate 40 constituting an inner plate. Plate 39 is the outer plate which is movable with respect to inner plate 40. Each bellows defines a collapsible chamber which communicates with hose 34 through a passage 42 as indicated in FIG. 3. Attached to each plate 39 is a pair of rectangular U-shaped channel frame members 44. Each arm of each channel member has a portion formed with gear teeth 45 so that the portion serves as a rack gear. The teeth in the oppositely disposed arms 47, 48 of one member 44 is shown clearly in FIG. 5. A gear box 50 having flange 51 is secured to each plate 39 by screws 52. Shaft 53 is journaled in the sides of gear box 50. This shaft carries gear 30 and another smaller gear 55 located within box 50. Gear 55 meshes with teeth 45 in arm 47 of frame member 44. Another gear 56 is located in box 50. This gear rotates on pin shaft 57 journaled in the sides of the box 50. Gear 56 meshes with gear 55 and with the teeth 45 in the other arm 48 of frame member 44.

In operation of the device, it is located below the surface of a body of water or other fluid. One bellows 36 at position I shown in FIG. 2 will be expanded. The bellows at upper position II will be partially compressed as gears 30 are engaged with teeth 28 of gears 20. The bellows at position VII will be fully compressed as will be the bellows at all other positions III—VI around the belts 31. Roller 32 is connected to shaft 61 as indicated in FIG. 1. One or more electric motors contained in fluid-tight casings 60 may be mounted on plates 14 by brackets 63 and arranged to drive the belts and rollers with conventional gears 64, 65 carried on the shafts of the motors and shaft 61, respectively. The motors may be energized via wires contained in cables 66. The cables may extend from the motor casings 60 outwardly of the apparatus and upwards along the frame plates 10 to a power source. The gears are set in recesses 67 in the plates 14 as indicated by dotted lines in FIG. 1. Inherent buoyancy of the expanded bellows at position I will carry the carriage member C thereat upward and cause all other carriage members C to move as indicated by arrows A with belts 31. The gear 30 at position VII is brought into contact with gears 25 and shaft 53 is rotated to rotate gears 55 and 56 in turn and cause the compressed bellows 36 to expand. When gears 30 leave gears 25 the bellows 36 is fully expanded and assists in moving the other carriage members. At position II, the gears 30 become engaged with gears 20 to compress the bellows 36 as the gears 55, 56 are rotated in opposite directions to their movements at position VII. The bellows are guided in expansion and compression movements by the arms 47, 48 of each frame member 44.

Agitation of the fluid environment of the device is maintained as long as the carriage members C move and the bellows 36 expand and contract.

As the successive bellows chambers expand and contract air flows from one chamber to the other through conduit 34. Any loss of air may be replaced by means of valve 35.

It is to be understood that FIGS. 6 and 7 show the preferred form of this invention.

In the form of the invention shown in FIGS. 6 and 7, carriage members C' carry bellows 36 between fixed exterior plates 71 and movable plates 39'. Plates 71 are each secured to the ends of frame arms 47, 48. The bellows is arranged to expand inwardly toward hose 34 from the compressed position shown in FIG. 7 and in FIG. 6, position VII. A compressible connecting hose 70 extends from the hose 34 to the opening 42' in end wall 36' of the bellows. The rack gears 20 and 25 are located at different angles than shown in FIG. 2 since it is required that gears 30 cause the bellows to expand between position VII and position I and to compress at position II with the bellows expanding in an inward direction and compressing in an outward direction. In FIG. 2, by contrast, the bellows are indicated as expanding in an outward direction and compressing in an inward direction. Hose 70 passes through an aperture in plate 72 which is secured to the inner ends of frame arms 47, 48. The plate 72 of each carriage member is secured to belts 31 by bolts 41 and nuts 41'.

In positions III through VI the bellows are fully compressed and begin to expand at position VII to reach full expansion at position I. At this position the bellows chambers exert their maximum lifting force in the fluid body in which the device is immersed. The air in the chamber flows freely into and out of the bellows through the hose 70 which expands and contracts as the bellows contracts and expands respectively.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A fluid agitating device, comprising in combination a vertical frame, an endless belt engaged on said frame for continual movement thereover in a vertical endless path, an endless air tube movable with said belt on the frame, a plurality of carriage members secured in spaced positions on said belt, each of said members including a bellows member providing an expansible and contractible chamber and communicating with said tube, opposing rack gears carried by each carriage member, a pair of gears engaged with each other and with the respective rack gears, a shaft carried by each carriage member, a spur gear carried by the shaft, a third rack gear mounted on said frame at an angle thereto and a fourth rack gear mounted on said frame at another angle thereto, said third and fourth rack gears being spaced from each other and arranged so that the spur gear engages therein respectively at spaced points in the path of movement of the carriage member, said bellows being opened when the spur gear is engaged by one of the rack gears and closed when the spur gear is engaged by the other rack gear, and motor means carried by said frame and operatively connected to drive said belt, whereby the bellows members are expanded in turn and form buoyant chambers to assist in moving the carriage members in said path when the device is wholly immersed in a body of liquid.

2. A fluid agitating device, comprising in combination a vertical frame, an endless belt engaged on said frame for continual movement thereover in a vertical endless path, an endless air tube movable with said belt on the frame, a plurality of carriage members secured in spaced positions on said belt, each of said members including a bellows member providing an expansible and contractible chamber and communicating with said tube, a shaft carried by each carriage member, a spur gear carried by the shaft, a first rack gear mounted on said frame at an angle thereto and another rack gear mounted on said frame at another angle thereto, said rack gears being spaced from each other and arranged so that the spur gear engages respectively in each rack gear at spaced points in the path of movement of the carriage member, said bellows being opened when the spur gear is engaged by one of the rack gears and closed when the spur gear is engaged by the other rack gear, and motor means carried by said frame and operatively connected to drive said belt, whereby the bellows members are expanded in turn and form buoyant chambers to assist in moving the carriage members in said path when the device is wholly immersed in a body of liquid.

3. A fluid agitating device, comprising in combination a vertical frame, an endless belt engaged on said frame for continual movement thereover in a vertical endless path, an endless air tube movable with said belt on the frame, a plurality of carriage members secured in spaced positions on said belt, each of said members including a bellows member providing an expansible and contractible chamber and communicating with said tube, a U-shaped channel member carried by each carriage member, the opposing arms of said channel member having rack gear teeth therein, a pair of gears engaged with each other and with the gear teeth of the respective arms, a shaft carried by each carriage member, a spur gear carried by the shaft, a first rack gear mounted on said frame at an angle thereto and another rack gear mounted on said frame at another angle thereto, said rack gears being spaced from each other and arranged so that the spur gear engages respectively in each rack gear at spaced points in the path of movement of the carriage member, said bellows being opened when the spur gear is engaged by one of the rack gears and closed when the spur gear is engaged by the other rack gear, and motor means carried by said frame and operatively connected to drive said belt, whereby the bellows members are expanded in turn and form buoyant chambers to assist in moving the carriage members in said path when the device is wholly immersed in a body of liquid.

4. A fluid agitating device, comprising in combination a plurality of spaced rollers mounted on a shaft, a pair of spaced vertical supports rotatably carrying said shaft, a plurality of endless belts engaged on said rollers for continual movement thereover, an endless closed air hose carried by said rollers, a plurality of carriage members secured in spaced positions on said belts, each of said members including a first plate, a bellows member secured to said plate, a second plate secured to the bellows member and defining with the first plate an expansible and contractible chamber, said first plate having an opening communicating with said hose so that air in the hose freely enters and leaves said chamber through said opening, a pair of gear boxes carried by said second plate, a pair of rectangular U-shaped channel members secured to said first plate, the opposing arms of said channel members having rack gear teeth therein, two pairs of gears, the gears of each pair of gears being engaged with each other and with the gear teeth of the respective arms, said gears being rotatably mounted in said gear boxes, a shaft journaled in the gear boxes, a pair of spur gears carried on the ends of said shaft, a first pair of rack gears mounted on said vertical supports, at an angle thereto in an upper position, another pair of rack gears mounted on said vertical supports at another angle thereto in a lower position, said pairs of rack gears being spaced from each other and arranged so that said spur gears engage respectively in each pair of rack gears at predetermined points in the path of movement of the carriage member, said bellows being opened when the spur gears are engaged by one of the pairs of rack gears and closed when the spur gears are engaged by the other pair of rack gears, and motor means mounted on said vertical supports and operatively connected to said shaft to rotate the rollers, whereby the bellows members are expanded in turn and form buoyant chambers to assist in moving the carriage members in said path when the device is wholly immersed in a body of liquid.

5. A fluid agitating device, comprising in combination a pair of spaced rollers mounted on a shaft, a pair of spaced vertical supports rotatably carrying said shaft, endless belt means engaged on said rollers for continual movement thereover, an endless closed air tube carried by said rollers, a plurality of carriage members secured in spaced positions on said belt means, each of said members including a first plate, a bellows member secured to said plate, a second plate secured to the bellows member and defining with the first plate an expansible and contractible chamber, said first plate having an opening communicating with said tube so that air in the tube freely enters and leaves said chamber through said opening, a pair of gear boxes carried by said second plate, a pair of rectangular U-shaped channel members secured to said first plate, the opposing arms of said channel members having rack gear teeth therein, two pairs of small gears, the gears of each pair of gears being engaged with each other and with the gear teeth of the respective arms, said gears being rotatably mounted in said gear boxes, a shaft journaled in the gear boxes, a pair of spur gears carried on the ends of said shaft, a first pair of rack gears mounted on said vertical supports at an angle thereto, and another pair of rack gears mounted on said vertical supports at another angle thereto, said pairs of rack gears being spaced from each other and arranged so that said spur gears engage respectively in each pair of rack gears at predetermined points in the path of movement of the carriage member, said bellows being opened by said small gears when the spur gears are engaged by one of the pairs of rack gears and being closed when the spur gears are engaged by the other pair of rack gears, and motor means mounted on said vertical supports and operatively connected to said shaft, whereby the bellows members are expanded in turn and form buoyant chambers to assist in moving the carriage members in said path when the device is wholly immersed in a body of liquid.

6. A fluid agitating device, comprising in combination a plurality of spaced rollers mounted on a shaft, a pair of spaced vertical supports rotatably carrying said shaft, an endless belt engaged on said rollers for continual movement thereover, an endless air tube carried by said rollers, a plurality of carriage members secured in spaced positions on said belts, each of said members including a bellows member providing an expansible and contractible chamber and having an opening communicating with said tube so that air in the tube freely enters and leaves said chamber, a pair of rectangular U-shaped channel members secured at one end of the bellows member, the opposing arms of said channel members having rack gear teeth therein, a pair of gears engaged with each other and with the gear teeth of the respective arms, said gears being rotatably mounted, a shaft, a spur gear shaft carried by said shaft, a first rack gear mounted on said vertical supports at an angle thereto, and another rack gear mounted on said vertical support at another angle thereto, said rack gears being spaced from each other and arranged so that said spur gear engages respectively in each rack gear at predetermined points in the path of movement of the carriage member, said bellows being opened when the spur gear is engaged by one of the rack gears and being closed when the spur gear is engaged by the other rack gear, and motor means mounted on said vertical supports and operatively connected to said shaft to rotate the rollers, whereby the bellows members are expanded in turn and form buoyant chambers to assist in moving the carriage members in said path when the device is wholly immersed in a body of liquid.

7. A fluid agitating device, comprising in combination a plurality of spaced rollers mounted on a shaft, a pair of spaced vertical supports rotatably carrying said shaft, an endless belt engaged on said rollers for continual movement thereover, an endless air tube carried by said rollers, a plurality of carriage members secured in spaced positions on said belts, each of said members including a bellows member providing an expansible and contractible chamber communicating with said tube so that air in the tube freely enters and leaves said chamber, a gear box carried by said carriage member, a pair of rectangular U-shaped channel members, the opposing arms of said channel members having rack gear teeth therein, a pair of gears engaged with each other and with the gear teeth of the respective arms, said gears being rotatably mounted in said gear box, a shaft journaled in sides of the gear box, a spur gear carried on one end of said shaft, a first rack gear mounted on said vertical supports at an angle thereto, and another rack gear mounted on said vertical supports at another angle thereto, said gears being spaced from each other and arranged so that said spur gear engages respectively in each rack gear at predetermined points in the path of movement of the carriage member, said bellows being opened when the spur gear is engaged by one of the pairs of rack gears and closed when the spur gear is engaged by the other pair of rack gears, and motor means mounted on said vertical supports and operatively connected to said shaft, whereby the bellows members are expanded in turn and form buoyant chambers to assist in moving the carriage members in said path when the device is wholly immersed in a body of liquid.

8. A fluid agitating device, comprising in combination a vertical frame, an endless belt engaged on said frame for continual movement thereover, air tubes movable with said belt on the frame, a plurality of carriage members secured in spaced positions on said belt, each of said members including a bellows member providing an expansible and contractible chamber and having an opening communicating with said tube so that air in the tube freely enters and leaves said chamber through said opening, a gear box carried by each carriage member, a rectangular U-shaped channel member carried by each carriage member, the opposing channel member, arms of said channel member having rack gear teeth therein, a pair of gears engaged with each other and with the gear teeth of the respective arms, said gears being rotatably mounted in said gear box, a shaft journaled in opposite sides of the gear box, a spur gear carried on the end of said shaft, a first rack gear mounted on said vertical frame at an angle thereto, another rack gear mounted on said vertical frame at another angle thereto, said rack gears being spaced from each other and arranged so that said spur gear engages respectively in each rack gear at predetermined points in the path of movement of the carriage member, said bellows being opened when the spur gear is engaged by one of the rack gears and closed when the spur gear is engaged by the other rack gear, and motor means carried by said frame and operatively connected to move the belt, whereby the bellows members are expanded in turn and form buoyant chambers to assist in moving the carriage members in said path when the device is wholly immersed in a body of liquid.

References Cited in the file of this patent

UNITED STATES PATENTS

| | | |
|---|---|---|
| 1,041,908 | Travis | Oct. 22, 1912 |
| 1,268,601 | Nielsen | June 4, 1918 |
| 1,276,383 | Ludekens | Aug. 20, 1918 |
| 1,344,675 | Budar et al. | June 29, 1920 |
| 1,497,957 | Streich | June 17, 1924 |
| 1,790,115 | Sells | Jan. 27, 1931 |
| 1,880,021 | McCauley | Sept. 27, 1932 |
| 1,941,244 | Bouda | Dec. 26, 1933 |

FOREIGN PATENTS

| | | |
|---|---|---|
| 1,330 | Great Britain | May 12, 1857 |
| 4,708 | Great Britain | Dec. 5, 1876 |